United States Patent [19]
Desormeaux

[11] Patent Number: 6,094,203
[45] Date of Patent: *Jul. 25, 2000

[54] ARCHITECTURE FOR A GRAPHICS PROCESSING UNIT USING MAIN MEMORY

[75] Inventor: David A. Desormeaux, Ft. Collins, Colo.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/932,435

[22] Filed: Sep. 17, 1997

[51] Int. Cl.$^7$ .............................. G06F 15/00; G06T 1/00
[52] U.S. Cl. ..................... 345/501; 345/511; 345/513; 345/424
[58] Field of Search .................... 345/503, 501, 345/507–509, 511, 513, 424

[56] References Cited

U.S. PATENT DOCUMENTS

| | | | |
|---|---|---|---|
| 5,008,838 | 4/1991 | Kelleher et al. | 345/508 |
| 5,559,952 | 9/1996 | Fujimoto | 345/511 |
| 5,828,382 | 10/1998 | Wilde | 345/430 |
| 5,844,576 | 12/1998 | Wilde et al. | 345/517 |
| 5,870,105 | 2/1999 | Jensen | 345/428 |
| 5,877,779 | 3/1999 | Goldberg et al. | 345/430 |
| 5,912,673 | 6/1999 | Howell et al. | 345/433 |

Primary Examiner—Raymond J. Bayerl
Assistant Examiner—Sy D. Luu
Attorney, Agent, or Firm—Alex Neudeck

[57] ABSTRACT

A CPU and a CPU cache memory unit is coupled to a system memory bus. A graphics processor with a graphics cache memory unit is also coupled to the system memory bus as a peer. The graphics processor and the graphics cache memory unit have the same priority as the CPU to access main memory. The graphics processor and the graphics cache unit retrieve input data from main memory and store this input data in a high-speed memory in the graphics cache unit. Data that represents a three-dimensional array is stored in the high-speed memory in the graphics cache unit in spatially contiguous blocks. This data may be first arranged into spatially contiguous blocks while it is still in main memory. Then, when a cache line is retrieved by the graphics cache unit, it will be stored in the high-speed memory in a spatially contiguous block.

9 Claims, 1 Drawing Sheet

ARCHITECTURE FOR A GRAPHICS PROCESSING UNIT USING MAIN MEMORY

BACKGROUND OF THE INVENTION

1. Field of the Invention

This invention relates generally to computer graphics hardware. More particularly, it relates to an architecture for interfacing a computer graphics processor to a general purpose computer. Even more particularly, it relates to an architecture for interfacing a computer graphics processor to a general purpose computer where the computer graphics processor operates on volumetric data for visualization applications.

2. Background of the Invention

Volumetric rendering is the process of taking a data set representing a three-dimensional volume, assigning a color and an opacity to each volume element, or voxel, and projecting them onto the image plane. An example might be the visualization of stress in a composite material under some applied force. Looking at only the highest and lowest stress is values and setting all other volume elements to a low opacity, it is possible to see how the material will react to various forces and where fractures may occur.

The techniques used to generate a realistic display of volumetric data involve computing the path of a light ray from screen pixel locations to its projected or reflected locations. Unfortunately, these techniques are very compute intensive, requiring a vary large number of numerical calculations for each pixel in the image, and each data point in the three-dimensional data set. Because of these compute requirements, many computer graphics workstations are equipped with a graphics accelerator cards.

Graphics accelerator cards contain specialized hardware that is optimized to render a screen image from a set of input data. The use of a graphics accelerator card improves both the graphics and general purpose computing performance of the workstation. The graphics performance is improved because the specialized hardware is capable of rendering the screen image much faster than the general purpose microprocessor through the use of specialized hardware. The general purpose computing performance is improved because the general purpose microprocessor is not burdened with the compute intensive task of rendering the screen image.

A typical graphics accelerator card consists of graphics processor that contains specialized hardware for rendering screen images, memory for storing both the input data and the rendered image, and an interface to an I/O bus for communicating with the rest of the computer system. The I/O bus is used by the computer system to supply commands and input data from main memory to the graphics accelerator card. Unfortunately, in modem graphics workstations, the I/O bus is relatively slow when compared to the speed of the central processing unit (CPU) or the graphics processor. This means the CPU may not be able to send new input data over the I/O bus to the graphics card fast enough to perform such desirable visualization tasks such as real-time animation or jitter-free object rotation. This problem is further compounded by the large data sets that comprise three-dimensional volumetric data. For example, a 512×512×512 array of 32-bit words would require over 4 seconds to transfer over a 33-MHZ, 32-bit I/O bus.

Another problem is the amount of memory necessary to store this data on the graphics card. The same 512×512×512 array, above, would requires 500 megabytes of memory on the graphics card. This significantly increases the cost of the graphics card and hence, the cost of the entire graphics workstation. Furthermore, if there is not enough memory on the graphics card to hold the entire data array, the array must be broken into smaller pieces that are operated on independently by the graphics processor. These pieces must be individually, and repeatedly, transferred over the I/O bus to the graphics card. Then some method must be used to combine the output from each of the smaller data pieces to form a single screen image. This process consumes a great deal of time, making any sort of real-time display unfeasible.

Accordingly, there is a need in the art for an improved architecture to interface a graphics processor to a general purpose CPU. Such an architecture should facilitate data transfer speed between the CPU and the graphics processor. Such an architecture should help minimize transfers between main memory and the graphics processor. Finally, such an architecture should also make efficient use of main and graphics card memory to minimize additional cost.

SUMMARY OF THE INVENTION

These and other needs are met with an architecture that closely ties the graphics subsystem to main memory. The graphics subsystem interfaces to main memory through a cache and cache control system. This gives the graphics subsystem the same throughput to and from main memory as the CPU. It also frees the graphics subsystem from memory limitations since, without any additional memory being added to the system, the graphics system may potentially use all of main memory space, and virtual memory, for the storage of data. Furthermore, it frees the CPU from having to conduct transfers over the I/O bus to supply the graphics card with data and commands to be rendered. Data is simply read from main memory into the graphic system cache much as a peer CPU would grab instructions and data in a multi-processor system. This allows the graphics subsytem to load only the data it needs rather than have all of the data, whether necessary or not, be loaded into the graphics subsystem by the CPU.

The graphics cache and cache coherency system may be organized to facilitate graphics processing. In particular, for volumetric rendering, the graphics cache may be organized into "blocks" that contain data for spatially contiguous volumes rather than the traditional cache "line" that contains data that is merely sequential in main memory. Organizing data into blocks may be done either by the CPU or by the graphics subsystem, under either software or hardware control. Furthermore, the blocking may be done when the data is still in main memory, while it is being transferred, or after it is in graphics cache.

DETAILED DESCRIPTION

Figure 1:
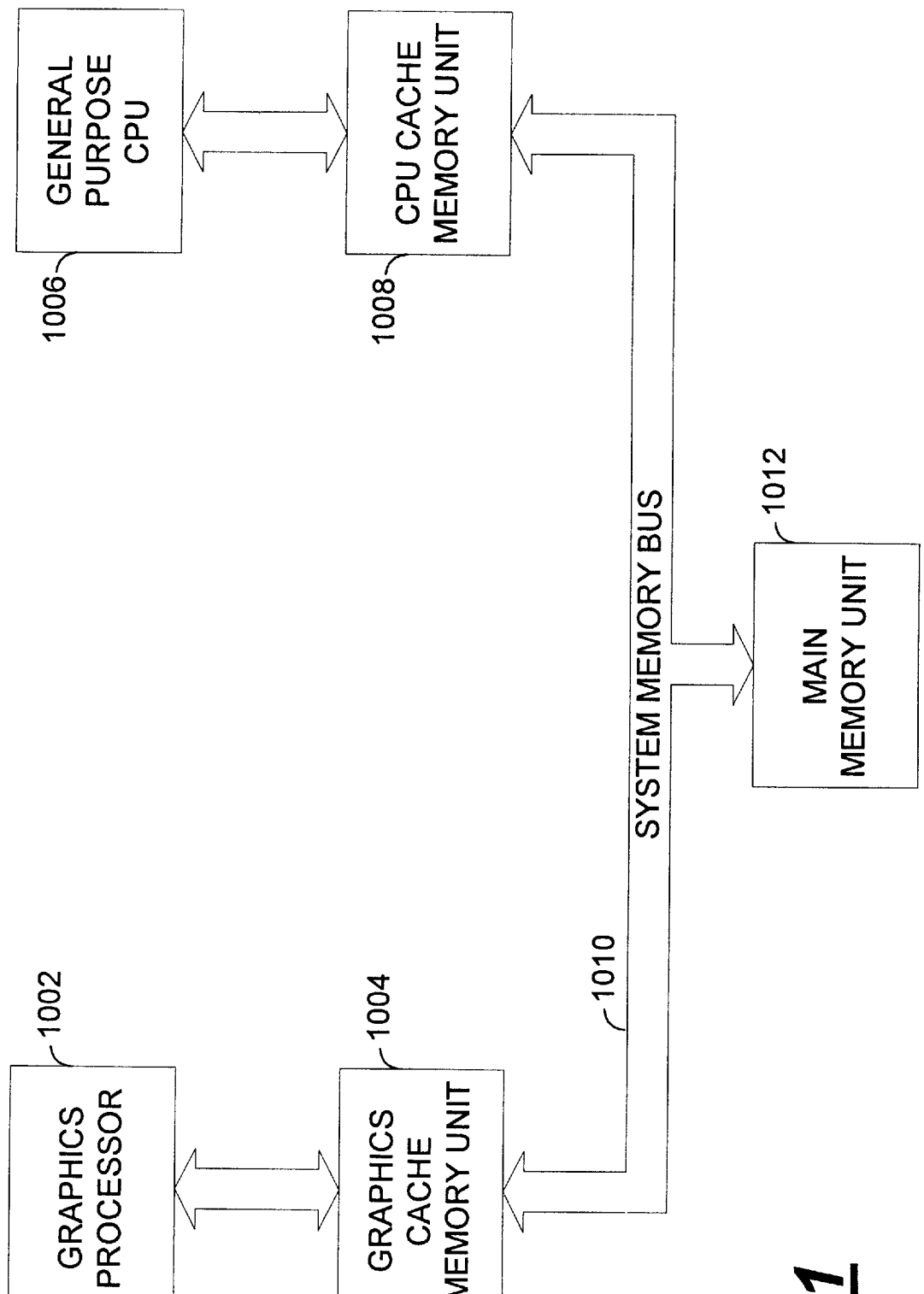
FIG. 1 shows a block diagram of a graphics workstation with a graphics processing unit according to the present invention.

FIG. 1 illustrates the architecture of a graphics workstation with a graphics (or volumetric) processor that uses main memory. The graphics processor 1002 is tightly coupled to the graphics cache memory unit 1004. The graphics cache memory unit 1004 interfaces to the system memory bus 1010 and the graphics processor 1002. The graphics cache memory unit, similar to a CPU cache unit, stores copies of recently used portions of main memory 1012 in a high-speed memory where the graphics processor can retrieve them when they are needed. The graphics cache memory unit is also responsible for updating, or invalidating, these local copies when data in the main storage changes, and for retrieving from main memory blocks of data that are not stored in the high-speed memory, but are needed by the graphics processor.

The general purpose CPU 1006 is tightly coupled to the CPU cache memory unit 1008. The CPU cache memory unit 1008 interfaces to the system memory bus 1010 and the general purpose CPU 1006. The CPU cache memory unit 1008 functions to retrieve, update, invalidate, and store cache lines from the main memory unit 1012 over the system memory bus 1010.

Giving the graphics processor 1002 a dedicated graphics cache memory unit 1004 gives the graphics subsystem the same throughput to and from main memory as the general purpose CPU 1006. It also frees the graphics processor 1002 from memory limitations since, without any additional memory being added to the system, the graphics system may potentially use all of main memory 1012, and virtual memory, for the storage of data. Furthermore, the general purpose CPU 1006 does not have to conduct transfers over an I/O bus to supply the graphics processor with data and commands to be rendered. Data needed by the graphics processor 1002 is simply read from main memory 1012 into the graphics cache unit 1004 much as a peer general purpose CPU would get instructions and data in a multi-processor system. Because the data needed by the graphics processor 1002 is read from main memory 1012 by the graphics cache unit 1004, this architecture allows the system designer to optimize the cost of the system verses the graphics performance without making software changes, or having to break the data array into hardware dependent portions. Cost may be traded off with performance merely by changing the size, and speed, of the high-speed memory in the graphics cache unit 1004. A faster, and larger high-speed memory in the graphic cache unit 1004 will be more expensive, but will yield higher graphics performance.

The high-speed memory in the graphics cache unit 1004 may be organized to facilitate graphics processing. In particular, for volumetric rendering, the graphics cache may be organized into "blocks" that contain data for spatially contiguous volumes rather than the traditional cache "line" that contains data that is merely sequential in main memory 1012. Organizing data into blocks may be done either by the general purpose CPU 1006, by the graphics processor 1002, or by the graphics cache unit 1004. Furthermore, the blocking may be done when the data is still in main memory 1012, while it is being transferred into the graphics cache unit 1004, or after it is in graphics cache unit 1004.

When the data is organized into blocks while it is still in main memory 1012, it allows the graphics cache unit 1004 to use a traditional cache "line" organization efficiently. If the data has already been "blocked" to an appropriate size (i.e. the size of a cache line), then each cache line contains data for a spatially contiguous volume. This allows the graphics cache unit 1004 to be designed, and function, just like the CPU cache memory unit 1008 using cache lines to communicate with main memory 1012, but still provide the graphics processor 1002 with spatial "blocks."

The above description is included to illustrate the preferred embodiments. It is not meant to limit the scope of the invention. The scope of the invention is to be limited only by the following claims. From the above discussion, may variations will be apparent to one skilled in the art that would yet be encompassed by the spirit and scope of the invention.

I claim:

1. An arrangement for general purpose computing and volumetric graphics rendering, comprising:
   a general purpose CPU for general purpose computing tasks, said general purpose CPU storing and retrieving volumetric data from a main memory unit;
   a graphics processor for graphics rendering of said volumetric data; and
   a graphics cache memory unit, said graphics cache memory unit being coupled to said graphics processor for supplying said graphics processor with said volumetric data, and said graphics cache memory unit being coupled to said main memory unit for obtaining said volumetric data from said main memory unit wherein said volumetric data represents data points for a first spatial volume having at least three-dimensions and wherein said graphics cache memory unit comprises a first plurality of cache memory lines and wherein a second plurality of cache memory lines that is a subset of said first plurality of cache memory lines may each individually and simultaneously contain data representing spatial volumes of at least three-dimensions that are subsets of said data points for said first spatial volume and wherein said spatial volumes of at least three dimensions may be non-adjacent to each other.

2. The arrangement of claim 1, wherein said graphics cache memory unit further comprises a high-speed memory.

3. The arrangement of claim 2, wherein said data is arranged in said main memory unit in a plurality of spatially contiguous blocks.

4. An arrangement for general purpose computing and volumetric graphics rendering, comprising:
   a general purpose CPU for general purpose computing tasks, said general purpose CPU storing and retrieving data from a main memory unit;
   a CPU cache memory unit coupled to said general purpose CPU and said main memory;
   a graphics processor for volumetric graphics rendering; and
   a graphics cache memory unit coupled to said graphics processor and said main memory wherein said graphics cache memory unit stores a plurality of individual subsets of said volumetric data simultaneously in individual cache lines and wherein individual members of said subsets of said volumetric data are each contained in an individual cache line and each individual subset of said volumetric data of said individual subsets of said volumetric data represents data for spatially contiguous volumes of at least three dimensions and wherein said spatially contiguous volumes may be non-adjacent to each other.

5. The arrangement of claim 4, further comprising:
   a system memory bus coupled to said main memory, said graphics cache unit, and said CPU cache unit.

6. The arrangement of claim 5, wherein said system memory bus controls access to said main memory unit by said graphics cache unit and said CPU cache unit.

7. A method of rendering graphics, comprising the steps of:
   storing volumetric data to be rendered in a main memory, wherein said volumetric data corresponds to data points for a three-dimensional volume;
   retrieving a block of said volumetric data from said main memory and storing said block in a graphics cache, wherein said block of said volumetric data is a subset corresponding to a first subvolume of said volumetric data and said block of said volumetric data is stored in said graphics cache in a single cache subunit, and said block of said volumetric data corresponds to data points that are spatially contiguous in at least three dimensions and wherein said first subvolume may be non-adjacent to all other subvolumes of data stored in cache subunits of said graphics cache;

operating on said block of said volumetric data to render an image of said volumetric data.

8. The method of claim 7, wherein said volumetric data is stored in said main memory unit in memory blocks the size of said single cache subunit and said memory blocks corresponds to data points that are spatially contiguous in at least three dimensions.

9. The method of claim 7, further comprising the step of:
retrieving part of said volumetric data from virtual memory and storing said part of said volumetric data in said main memory.

* * * * *